US009550847B2

(12) United States Patent
Bell et al.

(10) Patent No.: US 9,550,847 B2
(45) Date of Patent: Jan. 24, 2017

(54) METHOD FOR PRODUCTION OF POLYMER

(71) Applicant: INEOS EUROPE AG, Rolle (CH)

(72) Inventors: Andrew David Bell, Carry-le-Rouet (FR); Jean-Louis Chamayou, Carry le Rouet (FR); Imen Ghouila, Sausset les Pins (FR)

(73) Assignee: INEOS EUROPE AG, Rolle (CH)

( * ) Notice: Subject to any disclaimer, the term of this patent is extended or adjusted under 35 U.S.C. 154(b) by 0 days.

(21) Appl. No.: 14/427,493

(22) PCT Filed: Sep. 24, 2013

(86) PCT No.: PCT/EP2013/069775
§ 371 (c)(1),
(2) Date: Mar. 11, 2015

(87) PCT Pub. No.: WO2014/048892
PCT Pub. Date: Apr. 3, 2014

(65) Prior Publication Data
US 2015/0246989 A1  Sep. 3, 2015

(30) Foreign Application Priority Data
Sep. 28, 2012 (EP) .................................... 12186520

(51) Int. Cl.
*C08F 4/00* (2006.01)
*C08F 210/00* (2006.01)
(Continued)

(52) U.S. Cl.
CPC ............ *C08F 210/14* (2013.01); *C08F 210/16* (2013.01); *C08F 2400/02* (2013.01)

(58) Field of Classification Search
CPC ......... C08F 210/16; C08F 210/14; C08F 2/00; C08F 2/34; C08F 2400/02
(Continued)

(56) References Cited

U.S. PATENT DOCUMENTS 5,306,792 A    4/1994  Havas et al.
5,534,607 A †  7/1996  Martens
(Continued)

FOREIGN PATENT DOCUMENTS

EP    0 376 559 A1    7/1990
WO    WO 99/31142 A1  6/1999
(Continued)

OTHER PUBLICATIONS

Specification of Co-pending U.S. Appl. No. 14/427,429, filed Mar. 11, 2015, which is a National Phase of PCT International Application No. PCT/EP2013/069774 (WO 2014/048891 A1), filed Sep. 24, 2013, 22 pgs.

*Primary Examiner* — William Cheung
(74) *Attorney, Agent, or Firm* — Nixon & Vanderhye P.C.

(57) ABSTRACT

Method for controlling a process for the production of a polymer by polymerization of a monomer and a comonomer. The process includes maintaining a substantially constant effective flow ratio (EFR), the effective flow ratio being defined as $EFR=(Q_{como}-L_{como})/(Q_{mono}-L_{mono})$, $Q_{como}$ and $Q_{mono}$ being, respectively, flow rates of comonomer and monomer to the reactor, $L_{como}$ and $L_{mono}$ being, respectively, losses of comonomer and monomer.

21 Claims, 1 Drawing Sheet

(51) Int. Cl.
*C08F 10/14* (2006.01)
*C08F 210/14* (2006.01)
*C08F 210/16* (2006.01)

(58) Field of Classification Search
USPC .......................................... 526/348.5, 348, 90
See application file for complete search history.

(56) References Cited

U.S. PATENT DOCUMENTS

| | | | |
|---|---|---|---|
| 5,627,242 | A | 5/1997 | Jacobsen et al. |
| 6,348,635 | B1 † | 2/2002 | Herzog |
| 2005/0228543 | A1 | 10/2005 | Parrish et al. |
| 2007/0060721 | A1 | 3/2007 | Muhle et al. |
| 2010/0144981 | A1* | 6/2010 | Savatsky ................ C08F 10/00 526/59 |

FOREIGN PATENT DOCUMENTS

| | | |
|---|---|---|
| WO | WO 99/31143 A1 | 6/1999 |
| WO | WO 01/30871 A1 | 5/2001 |
| WO | WO 01/49751 A1 | 7/2001 |
| WO | WO 02/50127 A2 | 6/2002 |
| WO | 2008/030294 † | 3/2008 |
| WO | WO 2008/030294 A1 | 3/2008 |
| WO | WO 2008/076386 A1 | 6/2008 |

\* cited by examiner
† cited by third party

METHOD FOR PRODUCTION OF POLYMER

This application is the U.S. national phase of International Application No. PCT/EP2013/069775 filed Sep. 24, 2013 which designated the U.S. and claims priority to European Patent Application No. 12186520.8 filed Sep. 28, 2012, the entire contents of each of which are hereby incorporated by reference.

The present invention relates to the operation of a process for the production of a polymer by polymerisation of a monomer and a comonomer during steady-state and non-steady-state conditions.

BACKGROUND OF THE INVENTION

The polymerisation of olefin monomers in gas phase fluidised bed reactors is well-known. Control of such processes is required to ensure stable fluidisation and stable production of polymer with desired characteristics. As well as control during steady-state it is also important to control the process during periods of non-steady-state operation, such as during transitions and during start-ups.

At non-steady-state conditions it can be especially difficult to avoid the presence of off-specification material because it is especially difficult to control the density and melt index of polymer it is desired to produce.

A number of applications have attempted to address such problems during start-ups and at steady state.

WO 99/31143, for example, relates to a process for starting-up a polymerisation process in a gas phase fluidised bed which uses a catalyst based on chromium oxide. In the process described in this document the start-up involves two separate stages, the first in which olefin is introduced so as to maintain a constant partial pressure in the reactor, and the second in which olefin is introduced at a constant flow rate.

WO 99/31142 also relates to a process for starting-up a polymerisation process in a gas phase fluidised bed, but this time using a Ziegler-Natta type catalyst. In the process described in this document the start-up involves increases in the partial pressure of olefin and the rate of introduction of catalyst, whilst maintaining constant the ratios of the partial pressures of the olefin to hydrogen and to any comonomers.

WO 02/51027 relates to a start-up procedure for processes using at least two different catalyst compounds. The procedure involves calculating a trajectory, from elements including catalyst deactivation rate constants ($k_d$), for the rate of introduction of a catalyst system, into a reactor, and introducing the olefin monomer, a catalyst system, optional co-monomer, and optional chain transfer or termination agents into a polymerization reactor in a manner such that the catalyst system introduction rate is manipulated to follow the trajectory until a desired production rate is achieved.

U.S. Pat. No. 5,534,607 and U.S. Pat. No. 5,306,792 relate to operation of processes operating at steady state.

In particular, U.S. Pat. No. 5,534,607 relates to a continuous process for polymerisation of an alpha-olefin using a Ziegler-Natta type catalyst in which the reactor is fed with alpha-olefin at a constant rate and U.S. Pat. No. 5,306,792 relates to a continuous process for polymerisation of an alpha-olefin using a catalyst based on chromium oxide in which the reactor is fed with alpha-olefin and catalyst at constant rates.

SUMMARY OF THE INVENTION

An improved method has now been found for controlling polymerisation processes where the same control approach can be adopted under both steady-state and non-steady-state conditions.

Thus, in a first aspect, the present invention provides a method for controlling a process for the production of a polymer by polymerisation of a monomer and a comonomer which process comprises:

maintaining a substantially constant effective flow ratio (EFR), said effective flow ratio being defined as:

$$EFR=(Q_{como}-L_{como})/(Q_{mono}-L_{mono})$$

$Q_{como}$ and $Q_{mono}$ being, respectively, flow rates of comonomer and monomer to the reactor, $L_{como}$ and $L_{mono}$ being, respectively, losses of comonomer and monomer.

In a second aspect, the present invention provides a method for controlling a process for the production of a polymer by polymerisation of a monomer which process comprises:

maintaining a substantially constant effective flow ratio (EFR), said effective flow ratio being defined as:

$$EFR=(Q_{hyd}-L_{hyd})/(Q_{mono}-L_{mono})$$

$Q_{hyd}$ and $Q_{mono}$ being, respectively, flow rates of hydrogen and monomer to the reactor, $L_{hyd}$ and $L_{mono}$ being, respectively, losses of hydrogen and monomer.

As noted above, the present method can be adopted under both steady-state and/or non-steady-state conditions. In preferred embodiments, the present invention is applied during non-steady state conditions. In most preferred embodiments, the methods of the first and second aspects are applied during both steady-state and non-steady-state conditions.

The methods of the first and second aspects can be applied individually but where both comonomer and hydrogen are present in the same polymerisation process then it is preferred that both are applied.

As used in the present invention "maintaining a substantially constant effective flow ratio" requires determining losses of the relevant components, and if the losses of one or more of the relevant components varies over time then flow rates to the reactor are changed to maintain the effective flow rate substantially constant.

A particular advantage of the present invention is that the method for control is a predictive method rather than a reactive method. Reactive methods are methods where a property of the formed polymer is measured, such as density, melt index or comonomer incorporation, and this property is used as feedback control to the process. There is often a significant time lag in such methods due to the time for extraction and analysis of a sample of the polymer. Predictive methods, by contrast, seek to control the polymer properties using parameters which can be measured directly on the process with little or no time lag, and control of which allows control the polymer properties.

With respect to the first aspect, $Q_{mono}$ is a flow rate of monomer to the reactor and $Q_{como}$ is a flow rate of comonomer to the reactor.

In one embodiment $Q_{mono}$ and $Q_{como}$ may be determined as total flows of monomer and comonomer to the reactor. The "total" flows include fresh flows and recycle flows of the respective components.

In a preferred embodiment $Q_{mono}$ and $Q_{como}$ may be determined as flows of fresh monomer and fresh comonomer to the reactor.

$L_{mono}$ is a loss of monomer and $L_{como}$ is a loss of comonomer.

The losses are losses of the respective components from the process, and in one embodiment may be determined as "total" losses from the process, taking into account both losses in process purges and also losses of entrained hydrocarbons with polymer product. However, generally the latter of these is relatively small (and also relatively constant), and thus in a preferred embodiment, $L_{mono}$ and $L_{como}$ are determined as the losses of monomer and comonomer to purges.

Thus, in a preferred embodiment of the first aspect, the present invention provides a method for controlling a process for the production of a polymer by polymerisation of a monomer and a comonomer which process comprises:

maintaining a substantially constant effective flow ratio (EFR), said effective flow ratio being defined as:

$$EFR=(Q_{como}-L_{como})/(Q_{mono}-L_{mono})$$

$Q_{como}$ and $Q_{mono}$ being, respectively, the flow rates of fresh comonomer and fresh monomer feeds to the reactor, $L_{como}$ and $L_{mono}$ being, respectively, the losses of comonomer and monomer to purges.

The losses of monomer to purge can be readily determined from the concentration of monomer in the purge gas and the flow rate of the purge gas stream.

Where both gas and liquid purges are present the loss of comonomer to purges can comprise two components, namely the loss of comonomer in the gas purge (usually low) and the loss of comonomer in the liquid purge. In either case the respective losses can be readily determined from the concentration of comonomer in the purge and the flow rate of the purge stream.

The measurements of flow rates and concentration in the purge streams can be performed by any suitable technique. For example, the concentrations in the purge streams can be estimated or predicted using simple heat and mass balance and thermodynamic models known to the person skilled in the art. The use of gas chromatographs for concentrations measurements is widely used, and is preferred.

During steady-state operation the values of $L_{como}$ and $L_{mono}$ are substantially constant. In this scenario the values of $Q_{como}$ and $Q_{mono}$ can also therefore be maintained substantially constant to maintain a substantially constant effective flow ratio. (Nevertheless, it may still be useful to monitor $L_{como}$ and $L_{mono}$ and to ensure that there is maintained a substantially constant effective flow ratio.)

However, if one (or both) of the $L_{como}$ and $L_{mono}$ varies, for example due to a process upset or other non-steady state change, then $Q_{como}$ and $Q_{mono}$ should be changed to maintain the EFR substantially constant. For example, during a process upset (e.g. if a recycle compressor or recycle pump stops) $L_{como}$ and $L_{mono}$ will include the losses of comonomer and monomer due to that event.

With respect to the second aspect, $Q_{mono}$ is again a flow rate of monomer to the reactor, and whilst it may be determined as a total flow of monomer to the reactor, it is preferably determined as the flow of fresh monomer to the reactor.

$Q_{hyd}$ is a flow rate of hydrogen to the reactor. Again this may be determined as a "total" flow, taking into account both fresh and recycle flows. However, it is also preferably determined as the flow of fresh hydrogen to the reactor.

$L_{mono}$ is again a loss of monomer and in a preferred embodiment is determined as the loss of monomer to purges, which can be determined as previously noted from the concentration of monomer in the purge gas and the flow rate of the purge gas stream.

$L_{hyd}$ is a loss of hydrogen. Again, this loss may be determined as a "total" loss, taking into account both losses in process purges and also losses of entrained hydrocarbons with polymer product. However, generally the latter of these is particularly small for hydrogen, and thus in a preferred embodiment, $L_{hyd}$ is determined as the loss of hydrogen to purge.

Thus, in a preferred embodiment of the second aspect, the present invention provides a method for controlling a process for the production of a polymer by polymerisation of a monomer which process comprises:

maintaining a substantially constant effective flow ratio (EFR), said effective flow ratio being defined as:

$$EFR=(Q_{como}-L_{como})/(Q_{mono}-L_{mono})$$

$Q_{hyd}$ and $Q_{mono}$ being, respectively, the flow rates of fresh hydrogen and fresh monomer feeds to the reactor, $L_{hyd}$ and $L_{mono}$ being, respectively, the losses of hydrogen and monomer to purge.

Similar to the monomer loss $L_{hyd}$ can be readily determined from the concentration of hydrogen in the purge gas and the flow rate of the purge gas stream.

At steady state the values of $L_{hyd}$ and $L_{mono}$ are substantially constant. However, if one (or both) of these varies, for example due to a process upset or other non-steady state change, then $Q_{hyd}$ and $Q_{mono}$ should be changed to maintain the EFR substantially constant.

For avoidance of doubt, the present invention can be applied during steady-state operation and during non-steady-state operation, and also when switching from steady-state to non-steady-state and the reverse i.e. from non-steady-state to steady-state.

According to the present invention, the term "non-steady state" refers to periods/operation during which the production rate of polymer is not substantially constant or periods/operation during which the polymer properties of the polymer being produced are not substantially constant (in particular density, melt index or both). These changes in production rate or polymer properties may be deliberate changes applied by the Operator, for example during start-up or shut-down, or transitions, or may be changes caused by process upsets.

In contrast, at "steady-state" there is obtained a substantially constant hourly production of polymer and a substantially constant property of the polymer being made (in particular density and Melt Index).

It should be noted that the requirement for the hourly production of polymer to change during non-steady-state operation does not preclude relatively short periods during which production may be substantially constant. However, such periods are generally of a maximum of a few hours, whereas at "steady-state" a substantially constant hourly production of polymer will generally be maintained for a number of days, such as for at least 1 day, more usually at least 3 days, and often significantly longer.

In contrast, the total duration of a non-steady-state period is generally from a few hours to less than 3 days.

The term "substantially constant" as used herein means that a parameter varies by less than +/−10% from an average over a period of time. In relation to "non-steady-state" this period of time is the non-steady-state period, whereas in relation to "steady-state" a period of 1 day can be used.

More generally, a control system may act to try to maintain a parameter at a particular value, but variations of the parameter from the set point may occur due to noise in measurements and/or delays in response of the control system, but such control is still "steady-state".

The control and/or the switching of the present invention may be operated manually by an operator, but is more usually, and advantageously, operated using a computerised process control system.

As used herein, and as used in conventional process control terminology, a parameter (or variable) which it is desired to control or maintain at a defined value (set-point) may be referred to as a "controlled variable". According to the present invention the EFR can be used as controlled variable. A parameter (or variable) which is manipulated to control the controlled variable is referred to as a "manipulated variable".

Generally, to maintain the EFR's according to the present invention the flow rates of fresh monomer, fresh comonomer and/or fresh hydrogen to the reactor can be manipulated. Thus, these would be manipulated variables.

Examples of non-steady-state operation include start-up, process upsets and transitions.

As an example of application of the present invention under non-steady-state conditions reference may be made to the present invention as would be applied during start-up. In particular, the present invention then provides a method for the start-up of a process for the production of a polymer by polymerisation of a monomer which process comprises during start-up:

I. maintaining a substantially constant effective flow ratio (EFR), said effective flow ratio being defined as:

$$EFR=(Q_{como}-L_{como})/(Q_{mono}-L_{mono})$$

$Q_{como}$ and $Q_{mono}$ being, respectively, flow rates of comonomer and monomer to the reactor, $L_{como}$ and $L_{mono}$ being, respectively, losses of comonomer and monomer.

and/or

II. maintaining a substantially constant effective flow ratio (EFR), said effective flow ratio being defined as:

$$EFR=(Q_{hyd}-L_{hyd})/(Q_{mono}-L_{mono})$$

$Q_{hyd}$ and $Q_{mono}$ being, respectively, flow rates of hydrogen and monomer to the reactor, $L_{hyd}$ and $L_{mono}$ being, respectively, losses of hydrogen and monomer.

More preferably the present invention then provides a method for the start-up and subsequent steady-state operation of a process for the production of a polymer by polymerisation of a monomer which comprises the above control during start-up and the steady-state operation.

According to the present invention, and as in the art noted above, the term "start-up" refers to the period which passes between the time at which the introduction of the catalyst into the reactor is begun and the time at which a steady desired hourly production of polymer of substantially constant properties is reached ("steady state").

In general, prior to catalyst injection i.e. prior to a start-up period, the reactor is heated to an elevated temperature, pressurised to an elevated pressure, and the reaction composition adjusted to have the desired partial pressures of the monomer, any comonomer, any hydrogen and any other species present.

The temperature and pressure are usually at or close to the desired steady-state reaction temperature and pressure. Similarly the partial pressures of the monomer and any comonomer and/or hydrogen during start-up are usually at or close to the desired steady-state values.

The gas mixture is passed through and fluidises a "start-up bed" of polymer, usually a bed of deactivated polymer particles from a previous reaction.

Catalyst in then injected to initiate reaction, which step marks the start of the "start-up" period.

During start-up the hourly production of polymer is increased to the desired steady-state production rate.

As already noted more generally, it should be noted that the increase in the hourly production of polymer during the start-up phase does not preclude relatively short periods during start-up during which production may be substantially constant. Such is described, for example, in WO 99/31142. However, such periods are generally short compared to "steady-state". In particular, the total duration, T, of the start-up period is generally less than 3 days, with any periods of substantially constant production during start-up being significantly shorter still, and in particular of a few hours, such as of 6 hours or less.

The actual total duration, T, of the start-up period can vary according to the size of the reactor. With industrial-scale reactors, it is usually between 1 hour and 3 days, preferably between 10 and 48 hours.

As already noted, the term "substantially constant" as used herein means that a parameter varies by less than +/−10% from an average over a period of time. In relation to "start-up" this period of time is the start-up period.

The start-up period can advantageously be preceded by one or more purification periods, during which the reactor is freed as far as possible from impurities, such as oxygen or water, which poison the catalyst. The purification of the reactor can be carried out as indicated in European Patent Application EP-A-0180420.

As another example of application of the present invention under non-steady-state conditions reference may be made to the present invention as would be applied during a transition. In particular, the present invention then provides a method for transition of a process for the production of a polymer by polymerisation of a monomer which process comprises during the transition:

I. maintaining a substantially constant effective flow ratio (EFR), said effective flow ratio being defined as:

$$EFR=(Q_{como}-L_{como})/(Q_{mono}-L_{mono})$$

$Q_{como}$ and $Q_{mono}$ being, respectively, flow rates of comonomer and monomer to the reactor, $L_{como}$ and $L_{mono}$ being, respectively, losses of comonomer and monomer.

and/or

II. maintaining a substantially constant effective flow ratio (EFR), said effective flow ratio being defined as:

$$EFR=(Q_{hyd}-L_{hyd})/(Q_{mono}-L_{mono})$$

$Q_{hyd}$ and $Q_{mono}$ being, respectively, flow rates of hydrogen and monomer to the reactor, $L_{hyd}$ and $L_{mono}$ being, respectively, losses of hydrogen and monomer.

More preferably the present invention then provides a method for transition which involves transitioning from the steady-state operation for the production of a first polymer via non-steady-state operation (during the transition) to the steady-state operation for the production of a second polymer which comprises the above control during the transition and in the preceding and subsequent steady-state operations.

According to the present invention, the term "transition" refers to the period which passes between two sets of steady-state operation during which operation is "transitioned" from the first steady-state operation to the second steady-state operation. Transitions generally involve changes in the properties of the polymer being produced, such as density and melt index. A number of different transitioning strategies are known in the art, but the present invention is generally applicable to what are referred to as "continuous transitions", which are transitions where polymer continues to be produced during the transition. During such transitions the hourly production can be reduced and then increased again, or may be maintained throughout.

As should be clear from above the changes in production rate which may occur during a period of non-steady-state operation depend on the operation. Usually during a start-up period the production rate is increased, for example by increasing the rate of catalyst introduction, and thus the rates of feed for the fresh feeds needed to replace consumed materials increase during the start-up. In contrast, for a transition the production rate may initially be reduced from a first steady-state operation, and subsequently increased to a subsequent steady-state operation towards the end of the transition.

Similarly, during the period of non-steady-state operation the height of the fluidized bed may be substantially the same as that at steady-state, in which case the height of the bed is substantially constant throughout the process. Alternatively, the height of the bed can be changed during the non-steady-state operation. For example, for a transition the bed height may initially be reduced, and subsequently increased towards the end of the transition. For start-up, the reaction can be started with a lower bed and the height of the bed can be increased during the start-up period, as described in WO 99/31142.

Similarly, the fluidisation velocity of the gas mixture may be substantially constant during the non-steady-state period, or the velocity may be varied. For example, on a start-up the velocity may initially be lower than desired at steady-state, and be increased during the start-up period.

Regardless of any changes in the feed rates of the individual components during the non-steady-state operation, in the method of the present invention the effective flow ratios are also maintained constant.

The polymerization is preferably carried out in a gas phase fluidized-bed reactor. Such reactors/processes are generally known. Examples are described in French Patent No. 2,207,145 or French Patent No. 2,335,526.

The monomer is generally an olefin having from 2 to 10 carbon atoms. The comonomer may also be an olefin (other than the monomer) having from 2 to 10 carbon atoms, or may be a diene having from 2 to 10 carbon atoms.

As used herein, the term "monomer" refers to the monomer present in the reaction at the highest partial pressure, and the term "comonomer" refers to a monomer present at a lower partial pressure. Preferred monomers are ethylene and propylene, most preferably ethylene. Preferred comonomers are olefins having 4 to 8 carbon atoms, although ethylene may be a comonomer where propylene is the monomer, and vice versa.

Catalyst may be introduced into the reactor continuously or discontinuously. Catalyst can be introduced in particular using the equipment described in French Patent No. 2,562,077 or in French Patent No. 2,705,252. During a transition the catalyst may be changed.

The present invention may be applied to any suitable polymerisation catalyst, but is preferably applied to a process using a Ziegler-Natta type catalyst.

A Ziegler-Natta type catalyst is understood to mean a catalyst which comprises at least one transition metal chosen, for example, from titanium, vanadium, chromium, zirconium or hafnium. This catalyst can optionally comprise a magnesium halide, such as magnesium chloride or bromide, and/or a support based on a refractory oxide, such as silica or alumina. In particular a catalyst comprising titanium and/or vanadium, halogen and magnesium atoms can be used.

It is also possible to use a metallocene-based catalyst comprising at least one zirconium, titanium or hafnium atom, such as, for example, those described in EP 129368, U.S. Pat. No. 5,324,800 and EP 206794. It is also possible to use a catalyst containing a heteroatom bonded to a monocyclopentadienyl, such as, for example, the catalysts described in EP 416815 and EP 420436.

The catalyst is in principle used in conjunction with a cocatalyst which is an organometallic compound of a metal from Groups I to III of the Periodic Classification of the Elements, such as aluminium, boron, zinc or magnesium. For example, the cocatalyst can be an organoaluminium compound, such as a trialkylaluminium or an aluminoxane. Throughout the start-up period, the introduction of cocatalyst into the reactor is advantageously carried out so as to keep the cocatalyst to catalyst molar ratio constant. This ratio is preferably between 1 and 100. However, when a metallocene catalyst is used, this ratio can range from 1:10,000 to 10,000:1.

The catalyst can be used as is or optionally in the form of a prepolymer containing, for example, from 0.1 to 200 g, preferably from 10 to 100 g, of polymer per gram of transition metal. The process of the invention is particularly suited to the use of a non-prepolymerised catalyst.

The present invention is particularly applicable to polyethylene copolymer grades of low and medium density, which generally means products with densities in the range 890-940 kg/m$^3$. The present invention is in particular applicable to densities in the range 900-940 kg/m$^3$ for Ziegler products and in the range 890-930 kg/m$^3$ for metallocene products. As used herein, densities are non-annealed densities of the polymer as measured using method ISO 1183 A.

The reaction gas mixture may generally also contain an inert gas, which is generally nitrogen and/or an alkane, for example having from 1 to 8, preferably from 2 to 6, carbon atoms, such as pentane and/or isopentane.

The space time yield, which is the hourly production of polymer per unit volume of the reactor, is relatively low at the beginning of the start-up period, but increases throughout the start-up period to reach a final value at steady state which is generally in the range 50 to 200 kg/h/m$^3$.

Generally, the total pressure in the reactor at steady-state is between 0.5 and 5 MPa, preferably between 1.5 and 2.5 MPa.

The partial pressure of monomer at steady-state is generally between 0.3 and 1.5 MPa, preferably between 0.4 and 1.3 MPa.

The partial pressure of comonomer at steady-state is generally between 0 and 0.7 MPa, preferably between 0 and 0.5 MPa for Ziegler catalyst operation, preferably between 0 and 0.02 MPa for chromium operation and preferably between 0.005 and 0.02 MPa for metallocene operation.

The temperature at steady-state can generally range from 30° to 180° C., preferably from 90° to 120° C.

The fluidization velocity at steady-state rate can generally range from 45 to 80 cm/s. If a lower velocity is used at start-up then this may be in the range from 35 to 50 cm/s.

The process of the invention is particularly well suited to industrial-scale reactors of very large size which can have an hourly production of at least 10 tonnes of polymer. The reaction gas mixture containing the monomer and comonomer to be polymerized is generally cooled by means of at least one heat exchanger arranged outside the reactor before being recycled. Following the start-up period, the polymerization reaction is advantageously carried out as indicated in French Patent No. 2,666,337.

BRIEF DESCRIPTION OF THE DRAWINGS

The invention is further described with reference to the accompanying drawings, in which.

EXAMPLES

The Examples relate to simulated production of an LLDPE grade being produced on an industrial gas phase reactor of diameter 5 m and bed height 20 m at a target production rate of 34.2 te/hr using a metallocene catalyst and a reactor pressure of 24.2 barg. The reactor operates with a small purge to remove inerts which may otherwise build-up, but ethylene is also lost via the purge. In the present Examples comonomer (hexene) is recovered and hence is not lost to purge. At steady-state the purge flow rate and composition is approximately constant.

Prior to simulating changes to the system, the reactor is running in steady-state with average bed density and instantaneous powder density of 916.9 kg/m3. In both Examples a perturbation is introduced by a reduction in catalyst flow of 5%. Such a change in an actual plant could be caused, for example, by partial blockage of a feed line, poor control of feeder speed, change in catalyst density and fill factor or loss of catalyst activity.

Comparative Example

In the Comparative Example the ethylene flow to the reactor is controlled by the operator and fixed at the target production rate of 34.2 te/hr. This rate is maintained at steady state and throughout the perturbation.

The powder density is controlled via adjustment of mass flow ratio wherein the hexene flow rate is controlled to maintain fixed mass flow ratio of hexene to ethylene to the reactor. Feedback from powder analysis allows the operator to adjust this ratio if necessary but because of large lags in the system short-term perturbations and changes to instantaneous powder properties cannot be controlled accurately. In the Comparative Example, the hexene to ethylene mass flow rates are maintained at a ratio of 0.105, at steady state and throughout the perturbation.

At steady-state, the purge rate is approximately 200 kg/h, of which approximately 100 kg/h is ethylene monomer (the remainder is mainly nitrogen).

The loss of catalyst flow results in a reduction of ethylene consumption in the reactor, and consequently an increase in ethylene partial pressure as well as total reactor pressure.

The reactor total pressure controller compensates by increasing the purge rate from the reactor. The perturbations cause an oscillation in the reactor pressure and in the purge flow rate. The increase in purge flow rate in leads to an increased loss of ethylene.

Figure 1:
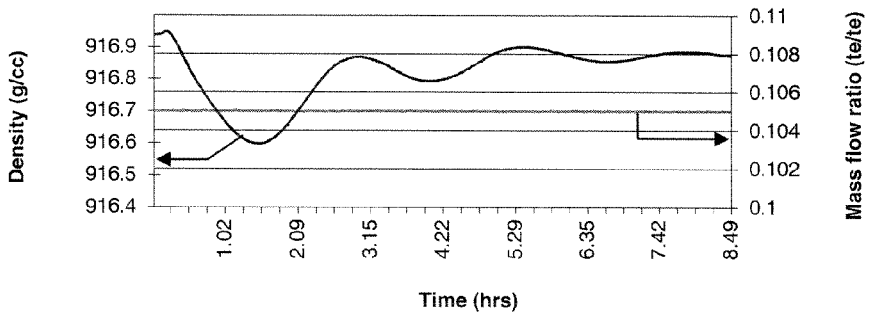
FIG. 1 shows the feed comonomer to ethylene mass flow ratio, which is constant, and the effect that the changes in reactor composition has on the instantaneous density of the polymer produced in the reactor.
Figure 2:
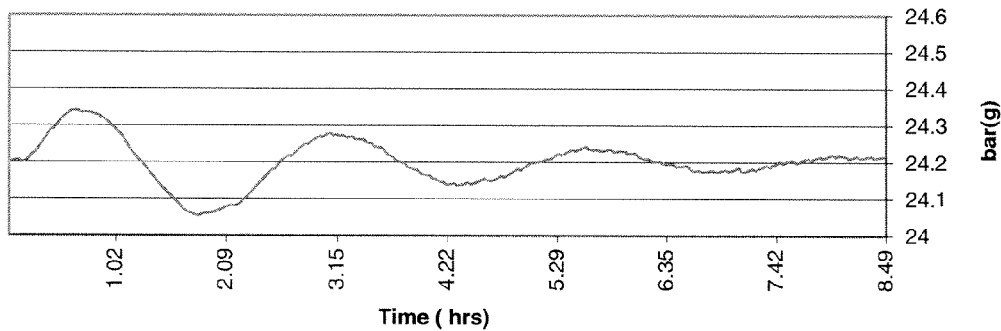
FIG. 2 shows the oscillations in reactor pressure.

The results of this are shown in FIGS. 1 and 2. In particular, FIG. 2 shows the oscillations in reactor pressure. Compensating for this the purge flow rate (note shown) changes correspondingly, from a maximum of about 1500 kg/hr to a minimum of nearly zero.

FIG. 1 shows the feed comonomer to ethylene mass flow ratio, which is constant, and the effect that the changes in reactor composition has on the instantaneous density of the polymer produced in the reactor. As well as the magnitude of the oscillations in density immediately following the perturbation it is noticeable that even once the reactor returns to a new steady-state there is an off-set in the density of the polymer compared to that prior to the perturbation.

The reactor is not controlled on effective flow ratio, but the process oscillates between a value for the hexene: ethylene effective flow ratio of 0.105 (when the purge valve is closed, wherein the effective flow ratio is the same as the feed ratio) to a value of 0.1073 (with the purge flow at its maximum and hence when most ethylene is lost to purge).

Even small changes in instantaneous density may have a damaging effect on reactor operation; usually reactor conditions (notably operating temperature) are selected to prevent formation of low density and low sintering temperature material, and such perturbations can give rise to agglomerates.

Example According to the Invention

In the Example according to the present invention the reactor is controlled on the hexene:ethylene effective flow ratio.

The steady-state conditions are as in the Comparative Example. Thus, the ethylene flow to the reactor is controlled by the operator and fixed at the target production rate of 34.2 te/hr. This rate is maintained at steady state and throughout the perturbation.

At steady-state, the purge rate is approximately 200 kg/h, of which approximately 100 kg/h is ethylene monomer (the remainder is mainly nitrogen).

In this example, however, the hexene flow rate is controlled to maintain a fixed effective flow ratio of hexene to ethylene. More particularly, the hexene to ethylene effective flow ratio is maintained at a ratio 0.1053. At steady-state this corresponds to the same mass flow ratio of 0.105 used in the Comparative Example.

(At steady-state, the flow rate of ethylene is 34.2 te/hr, the flow rate of hexene is 3.59 te/hr, and the loss of ethylene to purge is 0.1 te/hr, so the feeds flow ratio is 3.59/34.2=0.105, whilst the effective flow ratio is 3.59/(34.1−0.1), which is 0.1053.)

The simulated loss of catalyst flow results in a reduction of ethylene consumption in the reactor, and consequently an increase in ethylene partial pressure as well as total reactor pressure.

The reactor total pressure controller compensates by increasing the purge rate from the reactor. The perturbations cause an oscillation in the reactor pressure and in the purge flow rate. The increase in purge flow rate in turn leads to an increased loss of ethylene. In this Example, however, the comonomer feed is varied to compensate for the additional loss of monomer, and thereby maintain the effective flow ratio at 0.1053.

The reactor pressure oscillates in the same manner as the Comparative Example. However, the adjustment of comonomer feed to compensate for the increased loss of ethylene reduces the variation of comonomer to monomer in the reactor, which in turn reduces the oscillations in instantaneous density of the polymer. Both of these are shown in FIG. 3.

Figure 3:
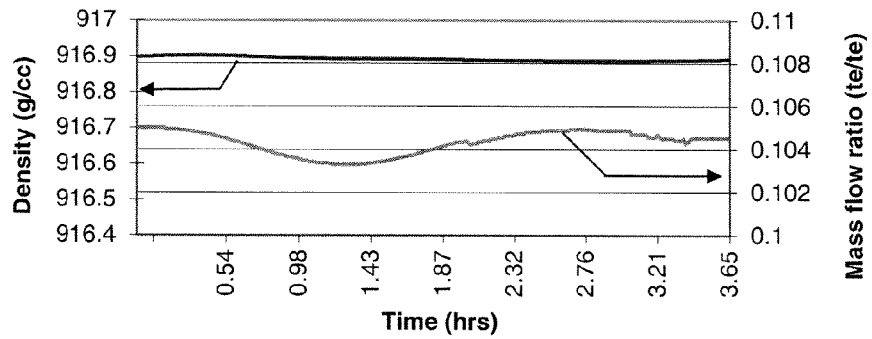
FIG. 3 shows that the adjustment of comonomer feed to compensate for the increased loss of ethylene reduces the variation of comonomer to monomer in the reactor, which in turn reduces the oscillations in instantaneous density of the polymer.

As is clear from comparison of FIG. 3 with FIG. 1, the use of effective flow ratio control significantly reduces the changes in instantaneous density of the polymer being formed in the reactor. Further, the new steady-state is achieved more rapidly than in the Comparative Example, and there is a smaller change in the powder density between the new steady-state and that prior to the perturbation.

The invention claimed is:

1. A method for controlling a process for the production of a polymer by polymerisation of a monomer and a comonomer which process comprises:
    maintaining a substantially constant effective flow ratio (EFR), said effective flow ratio being defined as:

$$EFR=(Q_{como}-L_{como})/(Q_{mono}-L_{mono})$$

$Q_{como}$ and $Q_{mono}$ being, respectively, flow rates of comonomer and monomer to the reactor,
    $L_{como}$ and $L_{mono}$ being, respectively, losses of comonomer and monomer.

2. A method according to claim 1 wherein $Q_{mono}$ and $Q_{como}$ are flow rates of fresh monomer and fresh comonomer to the reactor.

3. A method according to claim 1 wherein $L_{mono}$ and $L_{como}$ are losses of monomer and comonomer to purges.

4. A method for controlling a process for the production of a polymer by polymerisation of a monomer which process comprises:
    maintaining a substantially constant effective flow ratio (EFR), said effective flow ratio being defined as:

$$EFR=(Q_{hyd}-L_{hyd})/(Q_{mono}-L_{mono})$$

$Q_{hyd}$ and $Q_{mono}$ being, respectively, flow rates of hydrogen and monomer to the reactor,
    $L_{hyd}$ and $L_{mono}$ being, respectively, losses of hydrogen and monomer.

5. A method according to claim 4 wherein Qmono and Qhyd are flow rates of fresh monomer and fresh hydrogen to the reactor.

6. A method according to claim 4 wherein Lmono and Lhyd are losses of monomer and hydrogen to purges.

7. A method according to claim 1 which is applied under both steady-state and non-steady-state conditions.

8. A method according to claim 4 which is applied under both steady-state and non-steady-state conditions.

9. A method according to claim 1 which is a method for the start-up or transition of a process for the production of a polymer by polymerisation of a monomer and which process comprises during the start-up or transition:
    I. maintaining a substantially constant effective flow ratio (EFR), said effective flow ratio being defined as:

$$EFR=(Q_{como}-L_{como})/(Q_{mono}-L_{mono})$$

$Q_{como}$ and $Q_{mono}$ being, respectively, flow rates of comonomer and monomer to the reactor,
    $L_{como}$ and $L_{mono}$ being, respectively, losses of comonomer and monomer,
    and optionally
    II. maintaining a substantially constant effective flow ratio (EFR), said effective flow ratio being defined as:

$$EFR=(Q_{hyd}-L_{hyd})/(Q_{mono}-L_{mono})$$

$Q_{hyd}$ and $Q_{mono}$ being, respectively, flow rates of hydrogen and monomer to the reactor,
    $L_{hyd}$ and $L_{mono}$ being, respectively, losses of hydrogen and monomer.

10. A method according to claim 4 which is a method for the start-up or transition of a process for the production of a polymer by polymerisation of a monomer and which process comprises during the start-up or transition:
    I. maintaining a substantially constant effective flow ratio (EFR), said effective flow ratio being defined as:

$$EFR=(Q_{hyd}-L_{hyd})/(Q_{mono}-L_{mono})$$

$Q_{hyd}$ and $Q_{mono}$ being, respectively, flow rates of hydrogen and monomer to the reactor,
    $L_{hyd}$ and $L_{mono}$ being, respectively, losses of hydrogen and monomer,
    and optionally,
    II. maintaining a substantially constant effective flow ratio (EFR), said effective flow ratio being defined as:

$$EFR=(Q_{como}-L_{como})/(Q_{mono}-L_{mono})$$

$Q_{como}$ and $Q_{mono}$ being, respectively, flow rates of comonomer and monomer to the reactor,
    $L_{como}$ and $L_{mono}$ being, respectively, losses of comonomer and monomer.

11. A method according to claim 9 which comprises the above control during a start-up and subsequent steady-state operation.

12. A method according to claim 10 which comprises the above control during a start-up and subsequent steady-state operation.

13. A method according to claim 9 which comprises the above control during a transition and in preceding and subsequent steady-state operations.

14. A method according to claim 10 which comprises the above control during a transition and in preceding and subsequent steady-state operations.

15. A method according to claim 1 which is carried out in a gas phase fluidized-bed reactor.

16. A method according to claim 4 which is carried out in a gas phase fluidized-bed reactor.

17. A method according to claim 1 wherein the monomer is ethylene or propylene.

18. A method according to claim 4 wherein the monomer is ethylene or propylene.

19. A method according to claim 17 wherein the comonomer is an olefin having 4 to 8 carbon atoms, or ethylene where propylene is the monomer, or an olefin having 4 to 8 carbon atoms, or propylene where ethylene is the monomer.

20. A method according to claim 1 where the polymerisation process uses a Ziegler-Natta type catalyst, optionally in conjunction with a cocatalyst which is an organometallic compound of a metal from Groups I to III of the Periodic Classification of the Elements.

21. A method according to claim 4 where the polymerisation process uses a Ziegler-Natta type catalyst, optionally in conjunction with a cocatalyst which is an organometallic compound of a metal from Groups I to III of the Periodic Classification of the Elements.

* * * * *